J. R. MAYES & S. W. ESKEW.
LICENSE NUMBER DISPLAY DEVICE.
APPLICATION FILED SEPT. 10, 1913.
1,133,991. Patented Mar. 30, 1915.
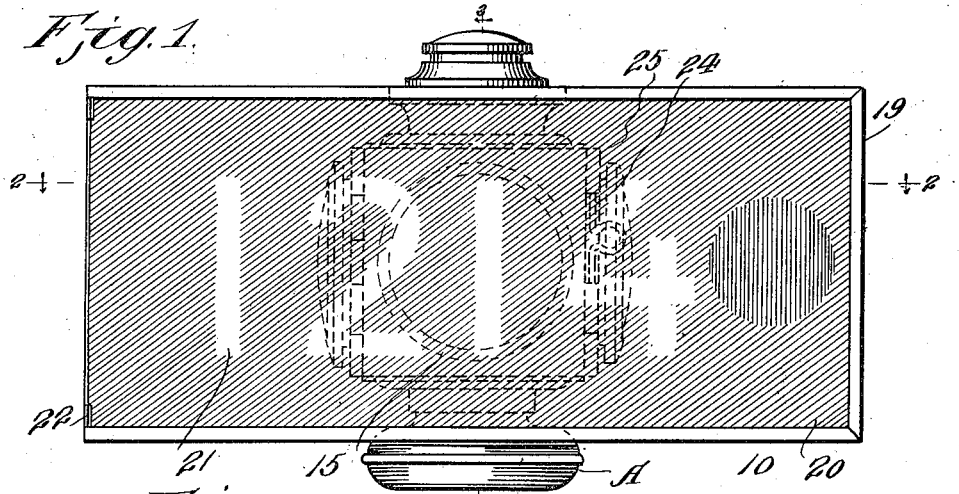
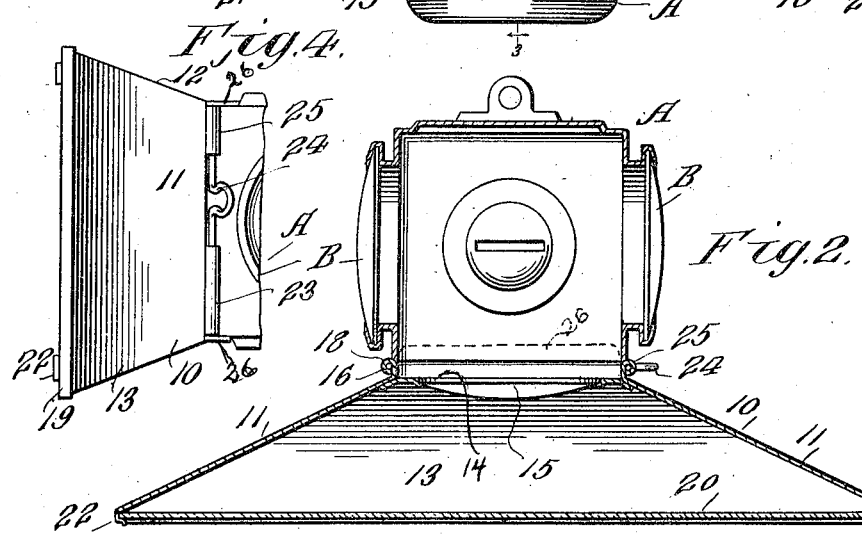
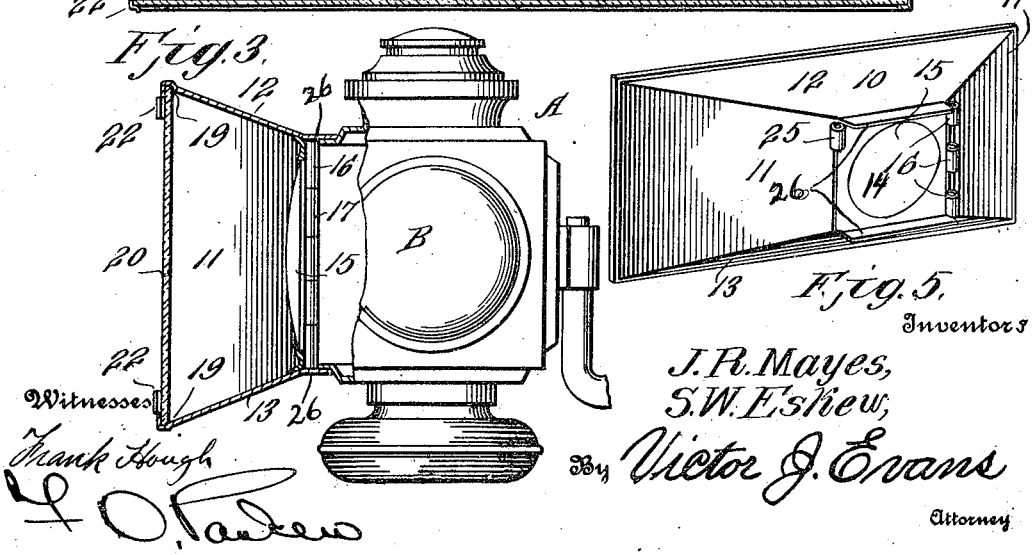
Inventors
J. R. Mayes,
S. W. Eskew,
By Victor J. Evans
Attorney
Witnesses
Frank Hough

UNITED STATES PATENT OFFICE.

JAMES R. MAYES, OF SPRINGFIELD, AND SAMUEL W. ESKEW, OF BARDSTOWN, KENTUCKY.

LICENSE-NUMBER-DISPLAY DEVICE.

1,133,991.   Specification of Letters Patent.   Patented Mar. 30, 1915.

Application filed September 10, 1913. Serial No. 789,106.

*To all whom it may concern:*

Be it known that we, JAMES R. MAYES and SAMUEL W. ESKEW, citizens of the United States, residing at Springfield, in the county of Washington, State of Kentucky, and Bardstown, in the county of Nelson and State of Kentucky, respectively, have invented new and useful Improvements in License-Number-Display Devices, of which the following is a specification.

The invention relates to an illuminated display device, and more particularly to the class of license number display devices for use on automobiles and the like.

The primary object of the invention is the provision of a device of this character wherein the light from the tail lamp of an automobile will be utilized for illuminating a license plate so that the same can be readily visible while the automobile is traveling or at a standstill, the light from the lamp being evenly distributed throughout the area of the license plate in a novel manner.

Another object of the invention is the provision of a device of this character wherein the casing for the license plate is of novel construction and is adapted to be connected to the tail lamp in lieu of the swinging door or any portion thereof so that the lamp can be lighted in the ordinary well-known manner and its light utilized for illuminating the license plate.

A further object of the invention is the provision of a device of this character wherein a display placard can be illuminated so as to make visible the indicia thereon for the easy reading of the placard, the device being of novel form and is readily and easily mounted upon a lamp or other illuminating device.

A still further object of the invention is the provision of a device of this character wherein the placard or plate bearing indicia can be readily removed from the casing thereof should the occasion require.

A still further object of the invention is the provision of a device of this character which is extremely simple in construction, thoroughly reliable and efficient in its purpose, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing: Figure 1 is a front elevation of a device constructed in accordance with the invention, the same being shown mounted upon a lamp. Fig. 2 is a sectional view on the line 2—2 of Fig. 1, looking in the direction of the arrow. Fig. 3 is an end elevation, the device being partly in section. Fig. 4 is a fragmentary enlarged end elevation, showing in detail the fastening pin. Fig. 5 is a perspective view, looking toward the rear side of the device detached from the lamp.

Similar reference characters indicate corresponding parts throughout the several views in the drawing.

Referring to the drawing in detail, A designates generally the tail lamp for use on an automobile, this lamp being of the ordinary well-known construction, having in opposite side walls of its body the usual light distributing bull's eyes B, while removed from its front is the usual swinging door and substituted therefor is the device hereinafter fully described.

The lamp A may be of the oil type or electrically illuminated, the same being shown merely to illustrate the mounting and the manner of use of the device hereinafter fully set forth.

The device comprises a body 10 preferably made from sheet metal having rearwardly convergent sides 11, top 12, and bottom 13, the rear being formed with an opening 14 which is covered by means of a lens 15, the latter being held in place in any desirable manner.

At one side of the lens and integrally formed with the rear of the body 10 are spaced alining pintle sleeves 16, while formed on the lamp A at the front thereof as usual are pintle sleeves 17, and through these sleeves is passed a pivot pintle 18 of the ordinary well-known construction so as to swingingly or otherwise connect the body 10 to the lamp according to the construction of lamp.

The forward, top and bottom, and one side edge of the body 10 are formed with guideways 19 in which is slidably fitted a plate 20, preferably made from glass, the same in this instance bearing indicia 21 indicative of a license number, it being understood of course that the said indicia may be varied and also the plate may be made from other material so that the device can be utilized for displaying an advertising sign, a license plate, or the like, and the light from the lamp utilized for making the same visible for the convenient reading thereof. The remaining side edge of the body 10 is formed with a spring latch 22 which engages the plate 20 so as to hold the same in the guideways 19 and also prevents the rattling thereof or displacement of the same when held in the body. It will be noted that the light from the lamp A will be distributed through the lens so as to make clear and fully illuminate the indicia present on the plate. Formed on the lamp A at the front thereof opposite the pintle sleeve 17 is a sleeve 23 in which is fitted a slidable locking pin 24, the same being adapted to engage in a sleeve 25 formed on the body 10 which is adapted to aline with the said sleeve 23 so as to receive the pin, and in this manner the body 10 will be locked closed relative to the lamp A, yet the said body can be swung to open position when it is desired. Formed on the body 10 at the top and bottom rear edges are flanges 26 which project outwardly therefrom in parallel relation to each other and are adapted to overlie portions of the lamp adjacent thereto when the body is in closed position on the lamp, as is clearly shown in Fig. 3 of the drawing, so as to prevent the admission of air between the same at such points.

It is of course to be understood that the invention is not restricted to the use of illuminating a license plate, as the same can be used for illuminating advertising signs, or for any other purpose desired. Furthermore, changes, variations and modifications may be made in the invention such as come properly within the scope of the appended claim, without departing from the spirit or sacrificing any of the advantages of the invention.

From the foregoing it is thought that the construction and manner of use of the device will be clearly understood, and therefore a more extended explanation has been omitted.

What is claimed is:—

A device of the class described comprising a body having outwardly divergent sides, top and bottom, and open at its front and back, a plate mounted in the front and adapted to be illuminated by the light from a lamp when the body is mounted thereon, a lens mounted in the back of the body and adapted to distribute the light throughout the area of the said plate, flanges formed at the top and bottom edges at the back of the body, and pintle sleeves formed at the side edges of the body at the back thereof, the said flanges and pintles providing means for securing the body in place on a suitable lamp.

In testimony whereof we affix our signatures in presence of two witnesses.

JAMES R. MAYES.
SAMUEL W. ESKEW.

Witnesses:
F. O. PARKER,
BENNETT S. JONES.